United States Patent [19]

Maki et al.

[11] Patent Number: 5,473,043

[45] Date of Patent: Dec. 5, 1995

[54] MOISTURE-CURABLE URETHANE RESIN COMPOSITIONS

[75] Inventors: Hirohisa Maki, Otsu; Shigenobu Miyamoto, Kameoka; Ryoji Fujimoto; Toshiki Noda, both of Kyoto, all of Japan

[73] Assignee: Dai-Ichi Kogyo Seiyaku Co., Ltd., Kyoto, Japan

[21] Appl. No.: 226,003

[22] Filed: Apr. 8, 1994

[30] Foreign Application Priority Data

Apr. 9, 1993 [JP] Japan ................... 5-083028
Apr. 28, 1993 [JP] Japan ................... 5-124994

[51] Int. Cl.$^6$ ........................................ C08G 18/10
[52] U.S. Cl. ......................... 528/60; 528/65; 528/66; 524/59; 524/589; 524/592; 524/593; 524/597
[58] Field of Search ........................ 528/60, 65, 66; 524/59, 589, 592, 593, 597

[56] References Cited

U.S. PATENT DOCUMENTS 5,087,661  2/1992  Aoki et al. ...................... 528/52
5,319,008  6/1994  Janoski ........................... 524/59

FOREIGN PATENT DOCUMENTS

| 48-20639 | 6/1973 | Japan . |
| 57-94056 | 6/1982 | Japan . |
| 59-5156  | 2/1984 | Japan . |
| 2-55715  | 2/1990 | Japan . |
| 5-8730   | 2/1993 | Japan . |

Primary Examiner—James J. Seidleck
Assistant Examiner—Duc Truong
Attorney, Agent, or Firm—Marshall, O'Toole, Gerstein, Murray & Borun

[57] ABSTRACT

Moisture-curable urethane resin compositions comprising: (a) a urethane prepolymer having two or more terminal isocyanate groups, (b) a blocked amine compound which is essentially nonreactive with an isocyanate group and generates a primary or a secondary amino group upon contact with water, and (c) an inorganic filler treated with an organic compound, are disclosed. More particularly, the urethane resin compositions comprise a hydrophilic urethane prepolymer having oxyethylene moieties, and a blocked amine compound having two or more oxazolidine rings.

8 Claims, No Drawings

MOISTURE-CURABLE URETHANE RESIN COMPOSITIONS

FIELD OF THE INVENTION

The present invention relates to moisture-curable urethane resin compositions of the single package-type which are useful as waterproofing agents for roofs, walls, and the like, and as sealants, wall covering materials, paving materials, floor covering materials, coatings and in similar applications.

BACKGROUND OF THE INVENTION

An example of a prior art single package urethane rein composition is a moisture-curable coating-type waterproofing agent, wherein a urethane prepolymer having a terminal isocyanate (NCO) group is mixed with an inorganic filler, as disclosed in Japanese Provisional Patent Publication No. SHO-57-94056, referred to hereinafter as "Prior Art I." In the case of Prior Art I, the NCO group can react with moisture in the air or in the substrate to generate carbon dioxide. The generation of carbon dioxide can cause "blisters", especially when the film coating is thick.

Japanese Patent Publication No. SHO-48-20639 (referred to hereinafter as "Prior Art II") and Japanese Provisional Patent Publication No. HEI-2-55715 (referred to hereinafter as "Prior Art III") disclose oxazolidine-isocyanate compositions. The compositions disclosed in Prior Art II and Prior Art III do not generate carbon dioxide during curing. However, when an oxazolidine-isocyanate composition is mixed with an inorganic filler and stored for a long period, the inorganic filler separates from the composition and settles to form a hard cake. Then, although the composition is a single package coating-type composition, it is necessary to thoroughly stir the composition before application to redisperse the inorganic filler and make the composition homogeneous. A single package coating-type composition provides an advantage only when the composition can be applied without the need to stir the composition before application. If the composition requires stirring before application, there is no advantage to using a single package-type material, and any two package-type composition can be used.

Japanese Patent Publication No. SHO-59-5156 (referred to hereinafter as "Prior Art IV") discloses a composition containing an enamine, and Japanese Patent Publication No. HEI-5-8730 (referred to hereinafter as "Prior Art V") discloses a composition containing a ketimine, respectively. Both Prior Art IV and Prior Art V, however, incorporate standard inorganic fillers which, when stored over a long period, pose disadvantages such as settling of the inorganic filler and slow curing speed.

It also is known that an organic or an inorganic anti-settling agent can be used in conjunction with an inorganic filler to prevent the filler from settling. However, when a commonly-used anti-settling agent is mixed with an oxazolidine-isocyanate composition, the anti-settling agent can retard curing or adversely affect the storage stability of the composition.

The present invention is directed to overcoming the drawbacks and disadvantages of the prior art compositions. An important aspect of the present invention therefore is to provide moisture-curable urethane resin compositions that do not separate and settle in storage, that cure relatively quickly in air, and that do not produce blisters in the film.

SUMMARY OF THE INVENTION

The moisture-curable polyurethane resin compositions of the present invention are characterized in that the compositions comprise (a) a urethane prepolymer having two or more terminal isocyanate groups, (b) a blocked amine compound which is essentially nonreactive with isocyanate groups and which produces a primary or a secondary amino group upon contact with moisture, and (c) an inorganic filler treated with an organic compound.

DETAILED DESCRIPTION OF THE PREFERRED EMBODIMENTS

In accordance with an important feature of the present invention, a urethane prepolymer having at least two terminal isocyanate groups can be, for example, a reaction product of a monohydroxy compound, such as an ethylene oxide adduct of methanol or ethanol, and a polyisocyanate; a reaction product of a compound having two or more active hydrogens and a polyisocyanate; or a single polyisocyanate.

A compound having two or more active hydrogens can be, for example, a polyester polyol having terminal hydroxyl groups produced by condensing a polyol, such as ethylene glycol, propylene glycol, diethylene glycol or trimethylol propane, and a polybasic acid, such as malonic acid, succinic acid, adipic acid or phthalic acid; a low molecular weight polyol, such as ethylene glycol, propylene glycol, 1,4-butanediol, 1,6-hexanediol or trimethylol propane; or a compound having hydroxyl groups, like for example, polybutadiene glycol, polyisoprene glycol, lactone ring-opening polymerization products, tetrahydrofuran ring-opening polymerization products, castor oil or a polyol, wherein the mean molecular weight per active hydrogen is preferably from 30 to 100,000. The compound having two or more active hydrogens can be a single compound having two or more active hydrogens or a mixture of compounds having two or more active hydrogens.

The urethane prepolymer having two or more terminal isocyanate groups can be a hydrophilic urethane prepolymer having oxyethylene moieties present in the molecule. A useful hydrophilic urethane prepolymer having at least two free isocyanate groups is obtained by reacting: (1) a polyoxyalkylene alcohol or polyol having an oxyethylene-containing oxyalkylene chain, wherein the oxyethylene moiety content in the oxyalkylene chain is 5 weight percent or greater, with (2) an organic polyisocyanate.

The above-mentioned monohydroxy compound, i.e., alcohol, or polyol can be selected, for example, from an alcohol, such as methanol, ethanol, propanol, butanol, octanol and lauryl alcohol; a diol such as ethylene glycol, propylene glycol, 1,3-butanediol, 1,4-butanediol and 1,6-hexanediol; a polyol such as glycerol, trimethylol propane and pentaerythritol; mono-, di- or triethanolamine, diglyercol, sorbitol and sucrose, either singly or in mixture. The polyoxyalkylene alcohol or polyol can be an alcohol or polyol obtained by addition polymerization of ethylene oxide only, or of ethylene oxide with propylene oxide or butylene oxide, according to well known methods, wherein the amount of oxyethylene moieties in the oxyalkylene chain is 5 weight percent or greater, and preferably from 10 to 100 weight percent.

The organic polyisocyanate reacted with the alcohol, the polyol or the compound having two or more active hydrogens, or used as the urethane prepolymer having two or more terminal isocyanate groups, preferably can be polymethylenepolyphenylpolyisocyanate, diphenylmethane diisocyanate, toluene diisocyanate, hexamethylene diisocyanate, xylylene diisocyanate, tetramethylxylylene diisocyanate, isophorone diisocyanate, naphthalene diisocyanate, hydrogenated diphenylmethane diisocyanate, either singly or in mixture, the biuret form, isocyanate form or carbodiimide-modified form. Such organic isocyanates can be used in the form of a crude product.

The hydrophilic urethane prepolymer can be obtained by reacting the alcohol or polyol with the organic polyisocyanate by a method known to those skilled in the art, at an NCO/OH equivalent ratio of 1.5/1 to 100/1, and preferably 2/1 to 50/1. The urethane prepolymer thus obtained typically all has essentially all unreacted isocyanate groups at the terminal ends.

The blocked amine compound that is essentially, and preferably completely, nonreactive with an isocyanate group and produces the primary or the secondary amino group by reacting with water (hereinafter referred to as "blocked amine compound") can be an aldimine, ketimine, enamine, oxazolidine, or similar compound. For example, the blocked amine compound can be a condensate of a compound having at least one primary or secondary amino group and an active oxygen, such as a primary or secondary amino group and a hydroxyl group (hereinafter referred to as the "activated hydrogen compound") and an aldehyde or a ketone, or a compound having two oxazolidine rings obtained from the condensation reaction between an N-hydroxy-oxazolidine and an organic polyisocyanate.

Typical activated hydrogen compounds include, for example, compounds having a primary amino group and a hydroxyl group, compounds having a secondary amino group and a hydroxyl group, compounds having a primary amino group and a secondary amino group, compounds having a primary amino group, a secondary amino group and a hydroxyl group, compounds having two primary amino groups, compounds having two secondary amino groups, and compounds having two secondary amino groups and two hydroxyl groups.

Specific examples of activated hydrogen compounds include, but are not limited to, 2-(2-aminoethoxy) ethanol, N-(2-aminoethyl)piperazine, omega-hydroxyhexylamine, N-methyl-1,6-hexandiamine, diethylenetriamine, N-(2-hydroxyethyl)ethylenediamine, 3-aminoethylpiperidine, N-(2-hydroxyethyl)piperazine, a polyamide obtained from various oils and fats (such as the dimer acid of tall oil fatty acid, and the like) and piperazine anhydride, 1-amino-3-aminomethyl-3,5,5-trimethylcyclohexanone, N-(methylaminoethyl)piperazine, aniline, toluidine, xylidine, isophoronediamine, diaminobenzene, diaminomethylnorbornane, diaminomethylbicycloheptanone, ethanolamine, diethanolamine, dipropanolamine, and hexanolamine.

Aldehydes or ketones to be condensed with activated hydrogen compounds include, for example, acetaldehyde, propionaldehyde, butyraldehyde, trimethylaldehyde, triethylacetaldehyde, valeroaldehyde, acrolein, crotonaldehyde, furfural, benzaldehyde, acetone, methyl ethyl ketone, methyl isobutyl ketone, diethyl ketone, diisobutyl ketone, methyl heptanone, cyclohexanone, trimethylcyclohexanone, isophorone, and acetophenone. The reactions between an activated hydrogen compound and an aldehyde or ketone are performed under the reaction conditions well known to those skilled in the art.

Compounds having two or more oxazolidine rings can be used as the blocked amine compounds, for example, the reaction product of N-hydroxyalkyl-oxazolidine and a polyisocyanate. N-hydroxyalkyl-oxazolidine is prepared in a condensation reaction between an aldehyde, such as formaldehyde, acetaldehyde, propionaldehyde, butyraldehyde or benzaldehyde, and a di(hydroxyalkyl)amine, such as diethanolamine or dipropanolamine. The polyisocyanate can be selected from, for example, the above-mentioned isocyanate compounds. A compound having two or more oxazolidine rings can be, for example, the product of the addition reaction between an N-hydroxyalkyl-oxazolidine and a diisocyanate, in a mole ratio of 2 to 1, respectively.

Compounds having two or more oxazolidine rings include an ester of an N-hydroxyalkyl-oxazolidine and a polycarboxylic acid. Polycarboxylic acids include, for example, oxalic acid, malonic acid, succinic acid, methylmalonic acid, isosuccinic acid, glutaric acid, adipic acid, itaconic acid, maleic acid, fumaric acid, phthalic acid, terephthalic acid, isophthalic acid, tetrachlorophthalic acid, mellitic acid and pyromellitic acid. Compounds having two or more oxazolidine rings can be obtained, for example, by esterification of two moles of N-hydroxyalkyl-oxazolidine and one mole of dicarboxylic acid, or by ester interchange with a dicarboxylic acid ester.

With respect to a compounding ratio of the above-described urethane prepolymer to the above-described blocked amine compound, it is desirable for the urethane resin composition to include 1 to 50 parts by weight of the blocked amine compound per 100 parts by weight of the urethane prepolymer. When the blocked amine compound is present at greater than 50 parts by weight per 100 parts by weight of urethane prepolymer, the resulting urethane resin composition is soft and has an inferior water resistance. On the other hand, when the blocked amine compound is present at less than one part by weight per 100 parts by weight of urethane prepolymer, film blistering is not prevented.

Inorganic fillers treated with an organic compound can be, for example, calcium carbonate treated with a fatty acid, such as lauric acid, stearic acid, palmitic acid, oleic acid or linoleic acid; calcium carbonate treated with a metal salt of a fatty acid, such as calcium palmitate, calcium stearate or sodium stearate; calcium carbonate treated with a fatty acid ester, such as stearyl stearate, lauryl stearate, methyl stearate, butyl stearate, steryl palmitate, lauryl palmitate or methyl laurate; calcium carbonate treated with a resin acid, such as calcium carbonate treated with rosin acid or abietic acid; calcium carbonate treated with a titanium compound, such as isopropytriisostearoyl titanate; calcium carbonate treated with a silane, such as silane coupling agent; calcium carbonate treated with a surface active agent, such as alkyl benzene sulfonate; calcium carbonate treated with a poly(acrylic acid); and talc, bentonite and similar inorganic fillers, treated with an organic compound as described above.

Inorganic fillers treated with an organic compound which are available commercially include, for example, MC. Coat S, M White, Snowlight SSS, EC Series, MS Series and Calfine Series of Maruo Calcium Co.; Raiton Series of Bihoku Funka Kogyo Co.; NCC Series and TSS Series of Nitto Funka Kogyo Co.; Gelton 50, SL-101, Hakuenka Series and Homocal Series of Shiraishi Kogyo Co. The inorganic filler treated with an organic compound is present in a urethane resin composition in an amount of at least 5 parts by weight, and preferably 10 parts by weight, per 100 parts by weight of the above-described urethane prepolymer. The inorganic filler treated with an organic compound is present in an amount of up to 400 parts, and preferably up to 250 parts, by weight per 100 parts by weight of the urethane prepolymer.

The urethane resin compositions of the present invention can include, when necessary, a solvent, catalyst, viscosity-lowering agent, plasticizer, pigment, coloring agent, extender, stabilizer, fire retardant, thixotropic agent, surface active agent, inorganic filler, urethane chips, rubber chips, and similar optional materials.

The urethane resin compositions of the present invention can be used as waterproofing agents, wall materials, floor materials, paving materials, sealing materials, and in similar applications by coating a urethane resin composition with a trowel, a roller, a rubber rake or similar application tool, by spraying the composition, or by injecting the composition with a pump to fill a space, on or in structures made of concrete, stone, tile, brick, glass, wood, plastic, metal, steel, rubber or a similar material of construction. When the present urethane resin compositions are coated, sprayed or injected, a primer such as urethane primer, epoxy primer or silicone primer can be used for surface preparation and enhanced composition adhesion.

To improve the weathering resistance and the abrasion resistance of the urethane resin composition, a topcoat, such as an acrylic urethane, acrylic, silicone, acrylic silicone or fluorocarbon coating composition, can be coated over the urethane resin composition. Moreover, the urethane resin compositions can be poured to flow over various cores of nonwoven fabric, woven fabric, net-like cloth, net, paper, or bituminized forms of these materials for membrane type waterproofing.

The blocked amine compound present in the urethane resin composition is hydrolyzed by moisture in the air to generate a primary amine or a secondary amine, which in turn reacts with terminal free isocyanate groups to form a crosslinked urethane polymer. In addition, when the urethane prepolymer present in the urethane resin composition is hydrophilic, the urethane prepolymer can absorb moisture in the air. Moisture permeates the urethane prepolymer, and thereby promotes hydrolysis of the blocked amine compound present in the composition. Accordingly, curing of the urethane resin composition is accelerated. Curing of the urethane prepolymer and the generated amine imparts flexibility and elasticity to the resulting urethane polymer, resulting in an elastomer having a network structure and demonstrating an improved water resistance, chemical resistance, elasticity and adhesion.

When an inorganic filler treated with an organic compound is present in the urethane resin composition in an amount of less than 10 parts by weight per 100 parts by weight of the urethane prepolymer, the reinforcing effect provided by the inorganic filler on the cured film is decreased. Moreover, the inorganic filler has a tendency to settle from the composition during storage and form a hard cake at the bottom of the storage container. When the inorganic filler treated with an organic compound is present in the urethane resin composition in an amount of less than 5 parts by weight per 100 parts by weight of the urethane prepolymer, the reinforcing effect of the inorganic filler essentially disappears, and the inorganic filler settles from the composition to form a hard cake much more easily.

On the other hand, when the inorganic filler treated with an organic compound is present in the urethane resin composition in an amount of greater than 250 parts by weight per 100 parts by weight of the urethane prepolymer, the resulting urethane resin composition has an excessively high viscosity, and is relatively difficult to coat, spray or inject. When the amount of inorganic filler treated with an organic compound in the urethane resin composition exceeds 400 parts by weight per 100 parts by weight of the urethane prepolymer, the viscosity increase is magnified as is the difficulty in applying the composition.

When the amount of inorganic filler treated with an organic compound is present in the urethane resin composition in an amount of 5 to 400 parts by weight per 100 parts by weight of the urethane prepolymer, the inorganic filler does not separate after a long storage period. The urethane resin composition also is easy to handle because the composition is free of so-called "webbing" during coating, spraying, or injecting and filling. Thus, urethane resin compositions of satisfactory workability are provided. The use of an inorganic filler treated with an organic compound also accelerates the cure of the urethane resin compositions and reinforces cured films resulting therefrom. It also has been hypothesized, but is not relied upon herein, that acceleration of curing is attributed to an acceleration of dissociation of the blocked amine compounds by the organic compound to treat the inorganic filler.

Compounds having oxazolidine rings (hereinafter also referred to as "oxazolidine ring compounds") are blocked amine compounds. The oxazolidine rings are hydrolyzed by moisture present in air, as shown in Eq. 1, to produce an amine-polyol. Furthermore, as shown in Eq. 2 and Eq. 3, the amine-polyol reacts with terminal free isocyanate groups to form crosslinking urethane polymers. The structure of the urethane prepolymer having free terminal isocyanate groups and the structure of the oxazolidine ring compound effect the flexibility and elasticity of the urethane polymer, thereby providing an elastic polymer. In particular, when the oxazolidine ring compound has two or more oxazolidine rings, the urethane polymers are elastic compounds having a network structure and improved water resistance, chemical resistance, adhesion and crack-following capability.

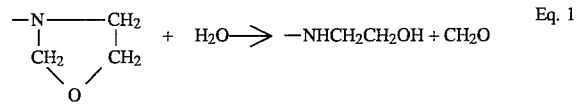

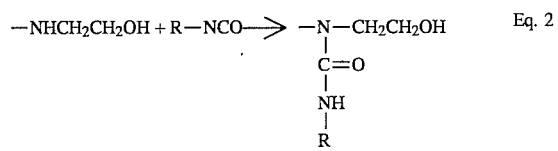

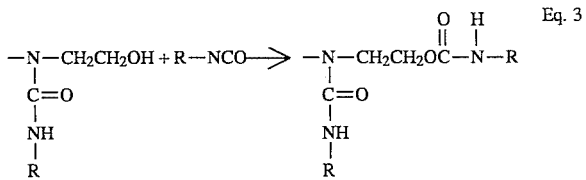

In accordance with an important feature of the present invention, the urethane resin compositions have the advantage of being a single package-type product. The composition therefore does not require the compounding and mixing operations required by two package systems. Hence, composition application is simplified and is time efficient, and the application time is not dependent on the pot life of the composition.

The present urethane resin compositions do not separate and do not cure during storage in a hermetically-sealed container. The compositions therefore have excellent storage stability.

The present urethane resin compositions cure rapidly in air. The cured film does not exhibit a foaming problem, and has excellent mechanical properties.

The urethane resin compositions can be used as a waterproofing agent, sealing agent, wall material, floor covering material, paving material, coating, or as a similar product to fulfill a particular application by a proper selection of the amount of inorganic filler treated with an organic compound included in the compositions and/or by the proper selection of a urethane prepolymer.

Embodiments

The following describe nonlimiting examples of the present invention.

EXAMPLE 1

100 parts by weight of calcium carbonate treated with lauric acid (an inorganic filler treated with organic matter); 30 parts by weight of dioctyl phthalate; 20 parts by weight of titanium dioxide; and 0.1 part by weight of carbon were introduced into a planetary mixer, then mixed and kneaded at room temperature for 15 minutes. Then, while being kneaded at 100° C., the mixture was dried in vacuo for one hour.

Next, a prepolymer I was prepared by admixing a poly(oxypropylene)poly(oxyethylene) glycol (mean molecular weight of 2000, and oxyethylene moiety content of 20 weight percent) and a poly(oxypropylene)poly(oxyethylene) triol (mean molecular weight of 4000, oxyethylene content of 20 weight percent), in a ratio of 2 to 1 by weight, respectively. The resulting mixture was allowed to react with toluene-2,4-diisocyanate at an NCO/OH equivalent ratio of 2:1. The terminal NCO group content in prepolymer I was 3.7 weight percent.

Then, 100 parts by weight of prepolymer I, 11.5 parts by weight of a blocked amine compound, and 10 parts by weight of xylene were admixed with the calcium carbonate-based mixture in the above-mentioned planetary mixer. The blocked amine compound was prepared by reacting equimolar amounts of hexanolamine and cyclohexanone, then reacting two moles of the resulting ketimine alcohol with one mole of toluene diisocyanate. The resulting mixture in the planetary mixer was mixed and kneaded at room temperature for 15 minutes to provide a moisture-curable urethane resin composition.

To evaluate composition storage stability, the composition was allowed to stand at 25° C. and at 50° C. for one month, respectively. Then, separation, tack-free time (according to JIS-A5758), viscosity and foaming of the urethane resin composition were measured. Moreover, the composition was allowed to stand at 25° C. for one month, then mechanical properties (hardness, tensile strength and extension) of the composition were evaluated according to JIS-K6301.

The results are tabulated in Table 1.

The measurement for separation of inorganic filler from the moisture-curable urethane resin composition was made by the following method. The urethane resin composition was added to separate one liter metallic containers. The containers were blanketed with nitrogen, then hermetically sealed. The containers were allowed to stand at 25° C. and 50° C. for one month, respectively, then the containers were examined to determine whether the inorganic filler had separated or settled. Foaming of the urethane resin composition was tested by a method wherein a urethane resin composition prepared as described above was poured over a slate plate preheated to 50° C. to provide a film thickness of 2 mm (millimeters). The film was allowed to stand at a constant 50° C. and was visually evaluated to determine whether the curing film foamed.

EXAMPLE 2

A moisture-curable urethane resin composition was prepared under the identical conditions as the composition of Example 1, except for the following: (1) calcium carbonate treated with stearyl palmitate was used as the inorganic filler treated with an organic compound in place of calcium carbonate treated with lauric acid; (2) a prepolymer II was prepared by mixing a poly(oxypropylene)poly(oxyethylene) glycol (mean molecular weight of 2000, oxyethylene content of 10 weight percent) and diphenylmethanediisocyanate at an NCO/OH equivalent ratio of 2.2:1; (3) the prepolymer II was used in place of the prepolymer I; and (4) 15.3 parts by weight of an enamine compound prepared from 1 mole of dimer acid of tall oil fatty acid, 1.2 moles of piperazine anhydride and 1.5 moles of 1-amino-3-aminomethyl-3,3,5-trimethylcyclohexanone was used in place of 11.5 parts by weight of the blocked amine compound of Example 1. Then, the storage stability and the mechanical properties of the composition were evaluated by the same methods as Example 1. The results also are tabulated in Table 1.

Comparative Example 1

A comparative moisture-curable urethane resin composition was prepared under the identical conditions as Example 1, except: (1) untreated calcium carbonate was used in place of calcium carbonate treated with lauric acid; (2) a prepolymer III having terminal NCO groups was prepared from a mixture of poly(oxypropylene) glycol (mean molecular weight of 2000) and poly(oxypropylene) triol (mean molecular weight of 4000), in a ratio of 2 to 1 by weight, respectively; and (3) the prepolymer III was used in place of the polyol of prepolymer I. Then, the storage stability and the mechanical properties of the comparative composition were evaluated by the same methods as Example 1. The results also are tabulated in Table 1.

TABLE 1

|  |  | Example 1 | Example 2 | Comparative Example 1 |
|---|---|---|---|---|
| Compounding (Parts by Weight) | Prepolymer I | 100 | | |
| | Prepolymer II | | 100 | |
| | Prepolymer III | | | 100 |
| | Ketimine compound | 11.5 | | 11.5 |
| | Enamine compound | | 15.3 | |
| | Calcium carbonate treated with lauric acid | 100 | | |
| | Calcium carbonate treated with | | 100 | |

TABLE 1-continued

|  |  | Example 1 | Example 2 | Comparative Example 1 |
|---|---|---|---|---|
| Storage stability | stearyl palmitate Untreated calcium carbonate After storage at 25° C. for 1 month |  |  | 100 |
|  | Separation | No separation or settling | No separation or settling | Separating or settling |
|  | Tack-free time (Hrs.) | 8 | 9.5 | 24 or over |
|  | Viscosity (mPa s/25° C.) | 6000 | 13000 | 11000 |
|  | Foaming After storage at 50° C. for 1 month | None | None | Observed |
|  | Separation | No separation or settling | No separation or settling | Gelled |
|  | Tack-free time (Hrs.) | 7.5 | 8 | — |
|  | Viscosity (mPA s/25° C.) | 8000 | 16000 | — |
|  | Foaming | None | None | — |
| Mechanical Properties | After storage at 25° C. for 1 month |  |  |  |
|  | Hardness (Shore A) | 50 | 45 | 50 |
|  | Tensile strength (kg/cm$^2$) | 38 | 35 | 25 |
|  | Extension (percent) | 550 | 480 | 380 |

As clearly seen from Table 1, the moisture-curable urethane resin compositions of Examples 1 and 2 showed no separation or settling of the inorganic fillers treated with an organic compound after storage at 25° C. and 50° C. for one month. The compositions of Examples 1 and 2 cured in air relatively quickly and the films were free of foaming. The composition of Comparative Example 1, however, showed separation and settling of the untreated inorganic filler after storage at 25° C. for one month. Separation is attributed to the untreated calcium carbonate. In the case of storage at 50° C. for one month, the composition of Comparative Example 1 gelled completely and therefore was useless.

EXAMPLE 3

Similar to Example 1, 100 parts by weight of calcium carbonate treated with lauric acid as the inorganic filler treated with an organic compound, 30 parts by weight of dioctyl phthalate, 20 parts by weight of titanium dioxide, and 0.1 part by weight of carbon were introduced into a planetary mixer. The resulting mixture was admixed and kneaded at room temperature for 15 minutes. Then, while being kneaded at 100° C., the mixture was dried in vacuo for one hour.

Next, 100 parts by weight of a poly(oxypropylene)poly-(oxyethylene) triol (mean molecular weight of 4000, and polyoxyethylene content 10 weight percent)/toluene diisocyanate prepolymer IV (terminal NCO group content of 3.7 weight percent), 10.6 parts by weight of an oxazolidine compound prepared from 2 moles of 2-(2-ethyl-1,3-oxazolidine-3-yl)-ethanol and 1 mole of toluene diisocyanate (hereinafter referred to as "bisTDIoxazolidine I"), and 10 parts by weight of xylene were added to the admixture in the planetary mixer. The resulting mixture was mixed and kneaded at room temperature for an additional 15 minutes to produce a moisture-curable urethane resin composition of the present invention. Then, the storage stability and the mechanical properties of the composition were evaluated by the same methods as Example 1. The results are tabulated in Table 2.

EXAMPLE 4

A moisture-curable urethane resin composition was prepared under the identical conditions as Example 3, except: (1) calcium carbonate treated with rosin acid was used as the organic filler treated with an organic compound; (2) a prepolymer V was used in place of the prepolymer IV of Example 3, wherein prepolymer V was prepared by reacting a poly(oxypropylene)poly(oxyethylene) glycol (mean molecular weight of 2000, and polyoxyethylene content of 15 weight percent) and diphenylmethanediisocyanate at an NCO/OH equivalent ratio of 2.2:1; and (3) 6.3 parts by weight of a reaction product of 2 moles of 2-(2-propyl-1,3-oxazolidine-3-yl)-ethanol and 1 mole of hexamethylenediisocyanate (hereinafter referred to as "bisHDIoxazolidine II"). Then, the storage stability and the mechanical properties of the composition were evaluated by the same methods as Example 1. The results also are tabulated in Table 2.

EXAMPLE 5

A urethane resin composition was obtained by a method similar to that of Example 3, wherein calcium carbonate treated with methyl stearate was used in place of the calcium carbonate treated with lauric acid of Example 3. Then, the storage stability and the mechanical properties of the composition were evaluated by the same methods as Example 1. The results also are tabulated in Table 2.

Comparative Example 2

A comparative moisture-curable urethane resin composition was prepared under the identical conditions as Example 3, except: (1) untreated calcium carbonate was used in place of the calcium carbonate treated with lauric acid of Example 3; and (2) a prepolymer VI having terminal NCO groups and prepared by using a poly(oxypropylene) triol (mean molecular weight of 4000) in the same manner as Example 3, was used in place of the polyol of the prepolymer IV. Then, the storage stability and the mechanical properties of the comparative composition were evaluated by the same methods as Example 1. The results also are tabulated in Table 2.

TABLE 2

| | | Example 3 | Example 4 | Example 5 | Comparative Example 2 |
|---|---|---|---|---|---|
| Compounding (Parts by Weight) | Prepolymer IV | 100 | | 100 | |
| | Prepolymer V | | 100 | | |
| | Prepolymer VI | | | | 100 |
| | BisTDIoxazolidine I | 10.6 | | 10.6 | 10.6 |
| | BisHDIoxazolidine II | | 6.3 | | |
| | Calcium carbonate treated with lauric acid | 100 | | | |
| | Calcium carbonate treated with rosin acid | | 100 | | |
| | Calcium carbonate treated with methyl stearate | | | 100 | |
| | Untreated calcium carbonate | | | | 100 |
| Storage stability | After storage at 25° C. for 1 month | | | | |
| | Separation | No separation or settling | No separation or settling | No separation or settling | Separating or settling |
| | Tack-free time (Hrs.) | 7.5 | 8.5 | 8.5 | 24 or over |
| | Viscosity (mPa s/25° C.) | 6500 | 13000 | 7800 | 11000 |
| | Foaming | None | None | None | Observed |
| | After storage at 50° C. for 1 month | | | | |
| | Separation | No separation or settling | No separation or settling | No separation or settling | Gelled |
| | Tack-free time (Hrs.) | 7.5 | 8 | 7.5 | — |
| | Viscosity (mPA s/25° C.) | 8100 | 15500 | 8000 | — |
| | Foaming | None | None | None | — |
| Mechanical Properties | After storage at 25° C. for 1 month | | | | |
| | Hardness (Shore A) | 53 | 62 | 55 | 50 |
| | Tensile strength (kg/cm$^2$) | 34 | 35 | 39 | 28 |
| | Extension (percent) | 570 | 540 | 510 | 380 |

As clearly seen in Table 2, the moisture-curable urethane resin compositions of Examples 3, 4 and 5 showed no separation or settling of the inorganic filler after storage at 25° C. and 50° C. for one month. The compositions of Examples 3–5 cured in air relatively quickly and the films were free of foaming. The composition of Comparative Example 2, however, showed separation and settling of the inorganic filler after storage at 25° C. for one month. Separation in Comparative Example 2 is attributed to the untreated calcium carbonate. In the case of storage at 50° C. for one month, the composition of Comparative Example 2 gelled completely and therefore was useless.

EXAMPLE 6

180 parts by weight of dioctyl phthalate, 200 parts by weight of calcium carbonate treated with lauric acid, 50 parts by weight of titanium dioxide, 0.3 parts by weight of carbon, and 10 parts by weight of an antioxidant were introduced into a planetary mixer. The resulting mixture was admixed and kneaded at room temperature for 10 minutes. Then, while being kneaded at 100° C., the mixture was dried in vacuo for one hour.

Next, a poly(oxypropylene)poly(oxyethylene) glycol (mean molecular weight of 2000, polyoxyethylene content of 20 weight percent) and polyoxypropylene triol (mean molecular weight of 3000) were admixed at a weight ratio of 2 to 1. The mixture and toluene-2,4-diisocyanate were reacted at an NCO/OH equivalent ratio of 1.5:1 to obtain 100 parts by weight of a hydrophilic prepolymer (terminal NCO group content of 2 weight percent). The hydrophilic prepolymer and 8 parts by weight of a dialdimine which was the reaction product of diaminomethylbicycloheptanone and triethylacetaldehyde at an equivalent ratio of 1:1 were incorporated into the mixture in the above-mentioned planetary mixer. The resulting mixture was mixed and kneaded in vacuo at room temperature for 15 minutes to obtain a moisture-curable urethane resin composition of the present invention.

Then, the composition was evaluated for tack-free time according to JIS-A5758, foaming, penetration according to JIS-K2808, and mechanical properties (100% modulus, tensile strength and extension) according to JIS-K6301. The results are tabulated in Table 3 below.

Comparative Example 3

A urethane resin composition was prepared under the identical conditions as Example 6, except: (1) 200 parts by weight of untreated calcium carbonate was used in place of the calcium carbonate treated with lauric acid of Example 6; (2) a poly(oxypropylene) glycol was used in place of the poly(oxypropylene)poly(oxyethylene) glycol, and (3) 5 parts by weight of hydrophobic silica "#R-972" of Nippon Aerosil Co. was mixed into the composition as a thixotropic agent. The properties of the composition of Comparative Example 3 were evaluated under the same conditions as Example 6. The results also are tabulated in Table 3 below.

TABLE 3

| | Example 6 | Comparative Example 3 |
|---|---|---|
| Tack-free time (Hrs.) | 2 | 24 or over |
| Foaming | None | Observed |

TABLE 3-continued

|  | Example 6 | Comparative Example 3 |
|---|---|---|
| Hardness (10–1 mm) Immediately after production | | |
| 1 second | 420 or over | 420 or over |
| 5 seconds | 420 or over | 420 or over |
| After 50° C./30 days | | |
| 1 second | 180 | 45 |
| 5 seconds | 280 | 95 |
| Mechanical 100% modulus (kg/cm$^2$) | 5.8 | 6.0 |
| Properties Tensile strength (kg/cm) | 27 | 21.5 |
| Extension (percent) | 1100 | 750 |

As clearly seen in Table 3, the moisture-curable urethane resin composition of Example 6 has excellent curing properties. The cured composition also was free of foaming. The viscosity of the composition of Example 6 after storage at 50° C. for 30 days was satisfactory for practical applications as demonstrated by a viscosity evaluation based on penetration. The mechanical properties also were sufficient.

The composition of Comparative Example 3, however, was difficult to cure. The cured composition exhibited foaming, and from the viscosity evaluation based on penetration, the viscosity of the composition after storage at 50° C. after 30 days increased significantly and the composition was not usable.

EXAMPLE 7

180 parts by weight of dioctyl phthalate, 200 parts by weight of calcium carbonate treated with lauric acid, 50 parts by weight of titanium dioxide, 0.3 part by weight of carbon, and 10 parts by weight of an antioxidant were introduced into a planetary mixer, admixed and kneaded at room temperature for 10 minutes. Then, while being kneaded at 100° C., the resulting mixture was dried in vacuo for one hour.

Next, a poly(oxypropylene)poly(oxyethylene) glycol (mean molecular weight of 2000, polyoxyethylene content of 20 weight percent) and a polyoxypropylene triol (mean molecular weight of 3000) were admixed at a ratio of 2 to 1. The resulting mixture and toluene-2,4-diisocyanate were reacted at an NCO/OH equivalent ratio of 1.7:1 to obtain a prepolymer (terminal NCO group content of 2.5 weight percent). 100 parts by weight of this prepolymer and 6.3 parts by weight of an esterification product of 2 moles of 2-(2-ethyl-1,3-oxazolidine-3-yl)-ethanol and 1 mole of adipic acid were added into the mixture in the above-described planetary mixer. The resulting mixture was mixed and kneaded in vacuo at room temperature for 15 minutes to obtain a moisture-curable urethane resin composition.

Then, in an identical manner to Example 6, the composition was evaluated for tack-free time according to JIS-A5758, foaming, penetration according to JIS-K2808, and mechanical properties (100% modulus, tensile strength, extension) according to JIS-K6301. The results are tabulated in Table 4 below.

Comparative Example 4

A moisture-curable urethane resin composition was prepared under the identical conditions as Example 7, except: (1) 200 parts by weight of untreated calcium carbonate was used in place of 200 parts by weight of the calcium carbonate treated with lauric acid of Example 7; (2) poly(oxypropylene) glycol (mean molecular weight of 2000) was used in place of poly(oxypropylene)poly(oxyethylene) glycol, and (3) 5 parts by weight of hydrophobic silica "#R-972" of Nippon Aerosil Co. was added as a thixotropic agent. The properties of the composition of Comparative Example 4 were evaluated under the same conditions as Example 7. The results also are illustrated in Table 4 below.

TABLE 4

|  | Example 7 | Comparative Example 4 |
|---|---|---|
| Tack-free time (Hrs.) | 1.2 | 24 or over |
| Foaming | None | Observed |
| Hardness (10–1 mm) | | |
| Immediately after production | | |
| 1 second | 420 or over | 420 or over |
| 5 seconds | 420 or over | 420 or over |
| After 50° C./30 days | | |
| 1 second | 180 | 45 |
| 5 seconds | 280 | 95 |
| Mechanical 100% modulus (kg/cm$^2$) | 5.5 | 6.0 |
| Properties Tensile strength (kg/cm) | 29.1 | 23.5 |
| Extension (percent) | 1050 | 890 |

As seen in Table 4, the moisture-curable urethane resin composition of Example 7 has excellent curing properties. The cured composition also was free of foaming. The viscosity of the composition of Example 7 after storage at 50° C. for 30 days was satisfactory for practical applications, as demonstrated by the results of a viscosity evaluation based on penetration. The mechanical properties also were sufficient.

The composition of Comparative Example 4, however, was difficult to cure. The cured composition exhibited foaming, and from the viscosity evaluation based on penetration, the viscosity of the composition after storage at 50° C. for 30 days increased significantly and the composition was not usable.

EXAMPLE 8

A urethane primer was coated on a roof of a concrete building at a rate of 0.2 kg/m$^2$. Three hours after the coating, the urethane resin composition of Example 1 was coated with a roller at a rate of 1 kg/m$^2$, and immediately thereafter, a polyester unwoven fabric reinforcing material (50 g/m$^2$) was applied over the coat of the urethane resin composition. Five hours later, the condition of the urethane resin coating was such that an individual could stand on the coating. Then, the urethane resin composition of Example 1 was troweled at rate of 1.5 kg/m$^2$. The next day, an acrylic urethane top-coat was sprayed over the coating of the urethane resin composition of Example 1.

The waterproofing layers thus provided did not exhibit any blistering, peeling or water leakage one and a half years after the application. The composition of Example 1 was a satisfactory waterproofing agent for roofs.

EXAMPLE 9

A primer was coated on a wall of a concrete building at a rate of 0.15 kg/m$^2$ with a brush. One hour after coating, a composition comprising 100 parts by weight of the urethane resin composition of Example 6 and 10 parts by weight of xylol was air-sprayed over the above-mentioned wall surface at a rate of 1 kg/m$^2$. On the next day, an acrylic urethane top-coat was air-sprayed over the coated wall surface at a rate of 0.2 kg/m².

The waterproofing layers thus provided did not demonstrate any blistering, peeling, discoloration, cracking or water leakage two years after the application. The composition of Example 6 was a satisfactory waterproofing agent for walls.

EXAMPLE 10

A primer was coated on a roof of a concrete building at a rate of 0.2 kg/m². Three hours after priming, the urethane resin composition of Example 3 was applied with a roller at a rate of 0.3 kg/m², and immediately after that, a polyester unwoven fabric reinforcing material (50 g/m²) was applied over the coat of urethane resin. Five hours later, the condition of the urethane resin coat was such that an individual could stand on the coating. Then, the urethane resin composition of Example 3 was troweled at a rate of 1.5 kg/m². The next day an acrylic urethane top-coat was sprayed over the urethane resin composition.

The waterproofing layers thus provided did not demonstrate any blistering, peeling or water leakage one and one half years after application. The composition of Example 3 was a satisfactory waterproofing agent for roofs.

EXAMPLE 11

A primer was coated over a wall of a concrete building at a rate of 0.15 kg/m² with a brush. One hour after coating, a composition comprising 100 parts by weight of the urethane resin composition of Example 7, and 10 parts by weight xylol was air-sprayed over the coated wall surface at a rate of 1 kg/m². On the next day, an acrylic urethane top-coat was air sprayed over the coated wall surface at a rate of 0.2 kg/m².

The waterproofing layers thus obtained did not demonstrate any blistering, peeling, discoloration, cracking, or water leakage two years after application. The composition of Example 7 was a satisfactory waterproofing agent for walls.

What is claimed is:

1. A moisture-curable urethane resin composition comprising:
   (a) 100 parts by weight of a urethane prepolymer having two or more terminal isocyanate groups;
   (b) 6 to 50 parts by weight of a blocked amine compound having two or more oxazolidine rings which is essentially nonreactive with an isocyanate group and which generates a primary or a secondary amino group upon contact with moisture; and
   (c) 5 to 400 parts by weight of an inorganic filler treated with an organic compound selected from the group consisting of calcium carbonate treated with a fatty acid, calcium carbonate treated with a fatty acid metallic salt, calcium carbonate treated with a fatty acid ester, calcium carbonate treated with a resin acid, calcium carbonate treated with a titanium compound, calcium carbonate treated with a silane, calcium carbonate treated with a surface active agent, calcium carbonate treated with a polyacrylic acid, talc treated with a fatty acid, talc treated with a fatty acid metallic salt, talc treated with a fatty acid ester, talc treated with a resin acid, talc treated with a titanium compound, talc treated with a silane, talc treated with a surface active agent, talc treated with a polyacrylic acid, and mixtures thereof.

2. The moisture-curable urethane resin composition of claim 1 wherein the urethane prepolymer comprises a hydrophilic urethane prepolymer having a polyoxyalkylene chain including oxyethylene moieties.

3. The moisture-curable urethane resin composition of claim 2 wherein the oxyethylene moieties are present in the polyoxyalkylene chain in an amount of 5 weight percent or greater.

4. The moisture-curable urethane resin composition of claim 2 wherein the oxyethylene moieties are present in the polyoxyalkylene chain in an amount of 10 weight percent or greater.

5. The moisture-curable urethane resin composition of claim 1 wherein the hydrophilic urethane prepolymer has free isocyanate groups and is obtained from a reaction between (1) a polyoxyalkylene alcohol or a polyoxyalkylene polyol and (2) an organic polyisocyanate.

6. The moisture-curable urethane resin composition of claim 1 wherein the hydrophilic urethane prepolymer comprises a reaction product of an alcohol and a polyisocyanate.

7. The moisture-curable urethane resin composition of claim 1 wherein the urethane prepolymer is a compound having free isocyanate groups and is obtained from a reaction between a compound having two or more active hydrogens and a polyisocyanate.

8. The moisture-curable urethane resin composition of claim 1 wherein the urethane prepolymer comprises a polyisocyanate.

* * * * *